United States Patent
Wan et al.

(10) Patent No.: US 11,434,312 B2
(45) Date of Patent: Sep. 6, 2022

(54) PHOTOCURABLE COMPOSITION FOR FORMING CURED LAYERS WITH HIGH THERMAL STABILITY

(71) Applicant: CANON KABUSHIKI KAISHA, Tokyo (JP)

(72) Inventors: Fen Wan, Austin, TX (US); Weijun Liu, Cedar Park, TX (US); Fei Li, Austin, TX (US); Timothy Brian Stachowiak, Austin, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/122,056

(22) Filed: Dec. 15, 2020

(65) Prior Publication Data

US 2022/0185914 A1 Jun. 16, 2022

(51) Int. Cl.
| | |
|---|---|
| *C08F 2/46* | (2006.01) |
| *C08F 2/50* | (2006.01) |
| *C08G 61/04* | (2006.01) |
| *C08F 212/08* | (2006.01) |
| *B05D 3/06* | (2006.01) |
| *C08F 222/10* | (2006.01) |
| *B32B 27/26* | (2006.01) |
| *B32B 27/30* | (2006.01) |

(52) U.S. Cl.
CPC ............... *C08F 2/50* (2013.01); *B05D 3/067* (2013.01); *B32B 27/26* (2013.01); *B32B 27/302* (2013.01); *B32B 27/308* (2013.01); *C08F 212/08* (2013.01); *C08F 222/102* (2020.02); *C08F 222/103* (2020.02); *C08F 222/104* (2020.02); *C08F 2800/20* (2013.01)

(58) Field of Classification Search
CPC ............... C08F 2/46; C08F 2/50; C08G 61/04
USPC ............................................. 522/5, 1; 520/1
See application file for complete search history.

(56) References Cited

U.S. PATENT DOCUMENTS

| | | | |
|---|---|---|---|
| 5,958,794 A | 9/1999 | Bruxvoort | |
| 7,455,891 B2 | 11/2008 | Kunz | |
| 9,493,620 B2 | 11/2016 | Okano | |
| 9,624,171 B2 | 4/2017 | Matsumoto | |
| 10,428,015 B2* | 10/2019 | Yanaba | C08G 59/4021 |
| 2001/0053820 A1* | 12/2001 | Yeager | C08L 2666/04 |
| | | | 525/186 |
| 2011/0105638 A1 | 5/2011 | Kawabe | |
| 2015/0147533 A1 | 5/2015 | Yamada | |
| 2015/0240015 A1* | 8/2015 | Yamada | C08F 2/48 |
| | | | 425/174 |
| 2016/0291463 A1 | 10/2016 | Miyazawa | |
| 2020/0339828 A1 | 10/2020 | Li | |
| 2021/0070906 A1 | 3/2021 | Li | |

FOREIGN PATENT DOCUMENTS

| | | |
|---|---|---|
| JP | 2011175724 A | 9/2011 |
| JP | 2012227190 A1 | 11/2012 |
| JP | 6092200 B2 | 3/2017 |
| JP | 2017050562 A1 | 3/2017 |
| JP | 6227545 B2 | 11/2017 |
| JP | 6371179 B2 | 8/2018 |
| JP | 6437446 B2 | 12/2018 |
| WO | 2016018870 A1 | 2/2016 |
| WO | 2020169316 A1 | 8/2020 |

OTHER PUBLICATIONS

Thermal stability and degradation of selected poly(alkyl methacrylates) used in the polymer industry J Therm Anal Calorim (2015) 119:1157-1161.
Synthesis and characterization of new spirobisindane-based poly(imide)s: Structure effects on solubility, thermal behavior, and gas transport properties J. Appl. Polym. Sci. 2020, DOI: 10.1002/APP.48944, 9 pages.
Multifunctional Hyperbranched Oligo(fluorene vinylene) Containing Pendant Crown Ether: Synthesis, Chemosensory, and Electroluminescent Properties Macromolecules 2009, 42, 8052-8061.
Synthesis, characterization and thermal oxidative stability of rigid epoxy polymers cured from aromatic mono- and di-amines J Polym Res (2013) 20:41, 10 pages.
The thermal stability of cross-linked polymers: methyl methacrylate with divinylbenzene and styrene with dimethacrylates Polymer Degradation and Stability 71 (2001), 9 pages.
Synthesis and characterization of UV-curable maleimide-terminatedimide oligomers Progress in Organic Coatings 100 (2016) 129-140.
Preparation of Microporous Organic Polymers via UV-Initiated Radical Copolymerization ACS Macro Lett. 2018, 7, 1283-1288.

* cited by examiner

*Primary Examiner* — Jessica Whiteley
(74) *Attorney, Agent, or Firm* — Abel Schillinger, LLP

(57) ABSTRACT

A photocurable composition can comprise a polymerizable material and a photo-initiator, wherein the polymerizable material can comprise at least one multi-functional vinyl-benzene in an amount of 15 wt % to 85 wt % and at least one multi-functional acrylate monomer in an amount of 15 wt % to 85 wt % based on the total weight of the photocurable composition. A photo-cured layer of the photocurable composition can have a high heat stability up to 400° C. and a glass transition temperature of at least 135° C.

20 Claims, 3 Drawing Sheets

PHOTOCURABLE COMPOSITION FOR FORMING CURED LAYERS WITH HIGH THERMAL STABILITY

FIELD OF THE DISCLOSURE

The present disclosure relates to a photocurable composition, particularly to a photocurable composition for inkjet adaptive planarization including divinylbenzene and at least one multi-functional acrylate monomer, wherein a photo-cured layer made from the photocurable composition has a high heat stability up to 400° C.

BACKGROUND

Inkjet Adaptive Planarization (IAP) is a process which planarizes a surface of a substrate, e.g., a wafer containing an electronic circuit, by jetting liquid drops of a curable composition on the surface of the substrate, and bringing a flat superstrate in direct contact with the added liquid to form a flat liquid layer. The flat liquid layer is typically solidified under UV light exposure, and after removal of the superstrate a planar surface is obtained which can be subjected to subsequent processing steps, for example baking, etching, and/or further deposition steps. There exists a need for improved IAP materials leading to planar cured layers with high thermal stability.

SUMMARY

In one embodiment, a photocurable composition can comprise a polymerizable material and a photo-initiator, wherein the polymerizable material can comprise at least one multi-functional vinylbenzene in an amount of 15 wt % to 85 wt % and at least one multi-functional acrylate monomer in an amount of 15 wt % to 85 wt % based on the total weight of the photocurable composition; and wherein a photo-cured layer of the photocurable composition can have a first weight loss of not greater than 10% during heating from 25° C. to 350° C. at a rate of 20° C./min, and a second weight loss of not greater than 2.0% during further heating from 350° C. to 400° C. at a rate of 20° C./min under nitrogen.

In one aspect, the first weight loss of the photo-cured layer may be not greater than 5%. In another aspect, the second weight loss of the photo-cured layer can be not greater than 1.5%.

In a further aspect, a glass transition temperature of a photo-cured layer after curing of the photocurable composition can be at least 135° C. In a certain particular aspect, the glass transition temperature can be at least 160° C.

In another aspect of the photocurable composition, the multi-functional acrylate monomer can be a tri-functional acrylate monomer, a tetra-functional acrylate monomer, or a combination thereof, and the multi-functional vinylbenzene can be divinylbenzene (DVB), or 1,3-diisopropenylbenzene (DPB), or a combination of DVB and DPB.

In one aspect, an amount of the DVB and/or DPB can be between 20 wt % to 50 wt %, and an amount of the multi-functional acrylate monomer can be between 35 wt % to 65 wt % based on the total weight of the photocurable composition.

In another aspect of the photocurable composition, an amount of the multi-functional acrylate monomer can be at least 60 wt %, and an amount of the DVB and/or DPB may be not greater than 35 wt % based on the total weight of the photocurable composition.

In yet a further aspect of the photocurable composition, the amount of the DVB and/or DPB can be at least 70 wt % based on the total weight of the photocurable composition.

In one aspect of the photocurable composition, a weight % ratio of DVB and/or DPB to the multi-functional acrylate monomer can range from 1:7 to 7:1.

In another aspect, the viscosity of the photocurable composition can be not greater than 30 mPa·s at a temperature of 50° C.

In a further aspect of the photocurable composition, an amount of the polymerizable material can be at least 90 wt % based on the total weight of the photo-curable composition.

In one embodiment, a laminate can comprise a substrate and a photo-cured layer overlying the substrate, wherein the photo-cured layer can be formed from the above-described photocurable composition.

In one aspect of the laminate, the second weight loss from 350° C. to 400° C. of the photo-cured layer can be not greater than 1.5%.

In a further aspect of the laminate, the photo-cured layer can comprise a glass transition temperature of at least 135° C.

In another embodiment, a method of forming a photo-cured layer on a substrate can comprise: applying a layer of a photocurable composition on the substrate, wherein the photocurable composition may comprise a polymerizable material and a photoinitiator, wherein the polymerizable material can comprise at least one multi-functional vinylbenzene in an amount of 15 wt % to 85 wt %, and at least one multi-functional acrylate monomer in an amount of 15 wt % to 85 wt % based on the total weight of the photocurable composition; bringing the photocurable composition into contact with a superstrate; irradiating the photocurable composition with light to form a photo-cured layer; and removing the superstrate from the photo-cured layer, wherein the photo-cured layer comprises a first weight loss of not greater than 10% during heating from 25° C. to 350° C. at a rate of 20° C./min, and a second weight of not greater than 2.0% during further heating from 350° C. to 400° C. at a rate of 20° C./min under nitrogen.

In one aspect of the method, the viscosity of the photocurable composition may be not greater than 30 mPa·s at a temperature of 50° C.

In another aspect of the method, the glass transition temperature of the photo-cured layer can be at least 135° C.

In a further embodiment, a method of manufacturing an article can comprise: applying a layer of a photocurable composition on a substrate, wherein the photocurable composition can comprise a polymerizable material and a photoinitiator, the polymerizable material can comprise at least one multi-functional vinylbenzene in an amount of 15 wt % to 85 wt %, and at least one multi-functional acrylate monomer in an amount of 15 wt % to 85 wt % based on the total weight of the photocurable composition; bringing the photocurable composition into contact with a superstrate; irradiating the photocurable composition with light to form a photo-cured layer; removing the superstrate from the photo-cured layer; forming a pattern on the substrate; processing the substrate on which the pattern has been formed in the forming; and manufacturing an article from the substrate processed in the processing, wherein the photo-cured layer can comprise a first weight loss of not greater than 10% during heating from 25° C. to 350° C. at a rate of 20° C./min, and a second weight loss of not greater than 2% during further heating from 350° C. to 400° C. at a rate of 20° C./min under nitrogen.

BRIEF DESCRIPTION OF THE DRAWINGS

Embodiments are illustrated by way of example and are not limited in the accompanying figure.

Figure 1A:
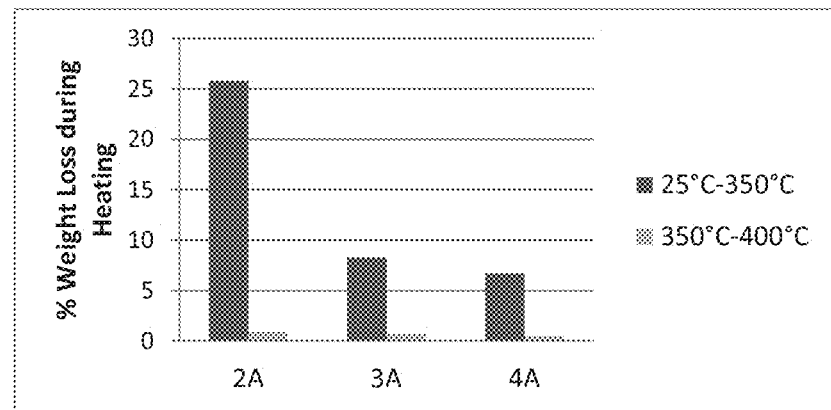
FIG. 1A includes a graph illustrating the first- and second weight loss during heating of photo-cured layers made from photocurable compositions containing about 78 wt % divinylbenzene and about 19 wt % multi-functional acrylate monomer with varying types of multi-functional acrylate monomers according to embodiments.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a photocurable composition comprising a polymerizable material and a photo-initiator, wherein the polymerizable material can comprise at least one multi-functional vinylbenzene (MFV) and at least one multi-functional acrylate (MFA) monomer. In one aspect, the amount of MFV can be between 15 wt % to 85 wt % and the amount of MFA can be between 15 wt % to 85 wt % based on the total weight of the photocurable composition.

It has been surprisingly observed that a photo-cured layer made from the photocurable composition of the present disclosure can have a high heat stability. In one aspect, a weight loss during heating under nitrogen of the photo-cured layer from 25° C. to 350° C. at a rate of 20° C./minute (herein also called "first weight loss") can be not greater than 10%, and a weight loss during further heating from 350° C. to 400° C. at a rate of 20° C./minute (herein also called "second weight loss") may be not greater than 2.0%.

As used herein, if not specifically noted otherwise, all heating to measure the first weight loss and the second weight loss was conducted under nitrogen atmosphere.

In a certain aspect, the first weight loss during the heating may be not greater than 8%, or not greater than 5%, or not greater than 3%.

In a further certain aspect, the second weight loss during the heating can be not greater than 1.8%, or not greater than 1.5%, or not greater than 1.3%, or not greater than 1.0%.

The photocurable composition can further have the surprising advantage that the corresponding photo-cured material may have a high glass transition temperature (Tg). In one aspect, the glass transition temperature of the photo-cured layer after curing the photocurable composition can be at least 135° C. In other particular aspects, the Tg can be at least 140° C., or at least 150° C., or at least 160° C., or at least 165° C., or at least 170° C., or at least 175° C., or at least 180° C.

As used herein, the term multi-functional acrylate monomer (MFA) relates to any monomer structure including two or more acrylate units, wherein the acrylate unite can be also a substituted acrylate unit, for example a methacrylate unit.

As used herein, the term multi-functional vinylbenzene (MFV) relates to any monomer structure including a benzene ring containing at least two vinyl groups or alkyl-substituted vinyl groups, for example, divinylbenzene (DVB), 1,3-diisopropenylbenzene (DPB), trivinylbenze, or tetravinylbenzene. Furthermore, the MFV can be an unsubstituted or a substituted MFV, wherein one or more of the H atoms of the benzene ring can be substituted by an alkyl group or a halogen or a functional group different than a vinyl-group.

In one embodiment, the MFA of the polymerizable material can be a tri-functional acrylate monomer, a tetra-functional acrylate monomer, or a combination thereof.

In a particular embodiment, the amount of the multi-functional vinylbenzene (MFV) contained in the photocurable composition can be at least 20 wt %, or at least 30 wt %, or at least 40 wt %, or at least 45 wt %, or at least 50 wt %, or at least 60 wt %, or at least 70 wt %, or at least 75 wt %, or at least 80 wt %. In another aspect, the amount of th MFV may be not greater than 83 wt %, or not greater than 80 wt %, or not greater than 75 wt %, or not greater than 70 wt %, or not greater than 65 wt %, or not greater than 70 wt %, or not greater than 60 wt %, or not greater than 50 wt %, or not greater than 45 wt %, or not greater than 40 wt %, or not greater than 30 wt %, or not greater than 25 wt % based on the total weight of the photocurable composition. The amount of MFV can be a value within a range between any of the minimum and maximum number noted above.

In another embodiment, the amount of multi-functional acrylate (MFA) monomer can be at least 20 wt %, or at least 30 wt %, or at least 40 wt %, or at least 45 wt %, or at least 50 wt %, or at least 60 wt %, or at least 70 wt %, or at least 75 wt %, or at least 80 wt %. In another aspect, the amount of MFA may be not greater than 83 wt %, or not greater than 80 wt %, or not greater than 75 wt %, or not greater than 70 wt %, or not greater than 65 wt %, or not greater than 70 wt %, or not greater than 60 wt %, or not greater than 50 wt %, or not greater than 45 wt %, or not greater than 40 wt %, or not greater than 30 wt %, or not greater than 25 wt % based on the total weight of the photocurable composition. The amount of MFA can be a value within a range between any of the minimum and maximum number noted above.

In certain embodiments, the multi-functional vinylbenzene (MFV) can be divinylbenzene (DVB). In another certain embodiment, the MFV can be 1,3-diisopropenylbenzene (DPB). In yet a further embodiment, the MFV may be a combination of DVB and DPB.

In one aspect, a weight percent ratio of MFV to MFA in the photocurable composition can be from 1:7 to 7:1, or from 1:4 to 4:1, or from 1:2 to 2:1, or from 1:1.5 to 1.5:1.

In a particular aspect, the amount of DVB and/or DPB can be between 20 wt % to 50 wt % based on the total weight of the photocurable composition, and the amount of MFA can be between 45 wt % and 65 wt % based on the total weight of the photocurable composition.

In another particular aspect of the photocurable composition, the amount of MFA can be at least 60 wt %, and the amount of DVB may be not greater than 35 wt % based on the total weight of the photocurable composition.

In yet a further particular aspect, the amount of DVB and/or DPB can be at least 70 wt % based on the total weight of the photocurable composition.

In another aspect, the polymerizable material of the photocurable composition can further include to a certain amount polymerizable monomers, oligomers, or polymers which are not a multi-functional vinylbenzene (MFV) or a multi-functional acrylate (MFA) monomer. Non-limiting examples of such polymerizable compounds can be mono-functional acrylate monomers, for example, benzyl acrylate, a maleimide monomer, a vinylether, or a styrene derivative.

In one embodiment, the photocurable composition of the present disclosure can have a low viscosity which may allow the use of these compositions in IAP applications. In one aspect, the viscosity of the photocurable composition at a temperature of 50° C. can be not greater than 35 mPa·s, such as not greater than 30 mPa·s, or not greater than 25 mPa·s, not greater than 20 mPa·s, not greater than 15 mPa·s, or not greater than 10 mPa·s, or not greater than 5, or not greater than 3 mPa·s. In another aspect, the viscosity may be at least 1 mPa·s, or at least 2 mPa·s, or at least 3 mPa·s. In a particular aspect, the photocurable composition can have a viscosity of not greater than 30 mPa·s. As used herein, all viscosity values relate to viscosities measured at a given temperature with the Brookfield method.

In another aspect, the photocurable composition can have a viscosity at a temperature of 23° C. of not greater than 120 mPa·s, or not greater than 100 mPa·s, or not greater than 50 mPa·s, or not greater than 30 mPa·s, or not greater than 20 mPa·s, or not greater than 15 mPa·s, or not greater than 10 mPa·s.

In yet a further embodiment, the amount of polymerizable material contained in the photocurable composition can be at least 75 wt % based on the total weight of the photocurable composition, such as at least 80 wt %, at least 85 wt %, at least 90 wt %, or at least 95 wt %. In another aspect, the amount of polymerizable material may be not greater than 99.5 wt %, such as not greater than 99 wt %, or not greater than 98 wt %, or not greater than 97 wt %, or not greater than 95 wt %, or not greater than 93 wt %, or not greater than 90 wt %. Moreover, the amount of polymerizable material can be within a range containing any of the minimum and maximum values noted above. In a particular aspect, the amount of polymerizable material can be at least 90 wt % and not greater than 97 wt % based on the total weight of the photocurable composition.

In a further aspect, the photocurable composition of the present disclosure may be free of a solvent.

In order to initiate the photocuring of the composition if exposed to light, one or more photoinitiators can be included in the photocurable composition.

In a certain aspect, the curing can be also conducted without the presence of a photo-initiator. In another certain aspect, the curing can be conducted by a combination of light and heat curing.

In a further aspect, the photocurable composition can contain at least one optional additive. Non-limiting examples of optional additives can be surfactants, dispersants, stabilizer, co-solvents, initiators, inhibitors, dyes, or any combination thereof.

In another embodiment, the present disclosure is directed to a laminate comprising a substrate and a photo-cured layer overlying the substrate, wherein the photo-cured layer can be formed from the photocurable composition described above.

In a certain aspect, the laminate can further include one or more layers between the substrate and the cured layer, for example an adhesion layer.

The present disclosure is further directed to a method of forming a photo-cured layer. The method can comprise applying the photocurable composition described above on a substrate; bringing the photocurable composition into contact with a superstrate; irradiating the photocurable composition with light to form the photo-cured layer; and removing the superstrate from the cured layer.

In one aspect, the light irradiation can be conducted with light having wavelength between 250 nm to 760 nm. In a preferred aspect, the light irradiation may be conducted with light having a wavelength between 300 nm and 450 nm.

The substrate and the solidified (photo-cured) layer may be subjected to additional processing to form a desired article, for example, by including an etching process to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like. In a certain aspect, the substrate may be processed to produce a plurality of articles (devices).

The photo-cured layer may be further used as an interlayer insulating film of a semiconductor device, such as LSI, system LSI, DRAM, SDRAM, RDRAM, or D-RDRAM, or as a resist film used in a semiconductor manufacturing process.

As further demonstrated in the examples, it has been surprisingly discovered that certain combinations of divinylbenzene and multi-functional acrylate monomer in a photocurable composition can have very suitable properties for TAP processing. The photocurable composition may have a low viscosity and can form photo-cured layers having an exceptionally high thermal stability up to 400° C. and can have a high glass transition temperature of up to above 180° C. in certain embodiments.

EXAMPLES

The following non-limiting examples illustrate the concepts as described herein.

(tetramethylolmethane tetraacrylate, herein called A4). Furthermore, comparative compositions were prepared containing as monomers either only divinylbenzene or only multi-functional acrylate monomers. All compositions further contained Irgacure 907 as photoinitiator and a surfactant (FS2000M1 from Wonda Science, MA, USA).

The exact weight % amounts of each monomer type based on the total amount of the photocurable composition are shown in Table 1. Table 1 further indicates what type of multi-functional acrylate monomer was used, such as A2, A3, or A4.

TABLE 1

| Sample | Amount of DVB [wt %] | Amount of MFA [wt %] | Type of MFA | Visc 25° C. | Visc 50° C. | % Weight loss TGA 25° C.-350° C. | % Weight loss TGA 350° C.-400° C. |
|---|---|---|---|---|---|---|---|
| S1* | 87.4 | 9.7 | A2 | 1.4 | | 30.9 | 0.6 |
| S2* | 87.4 | 9.7 | A3 | 1.5 | | 29.4 | 0.5 |
| S3* | 87.4 | 9.7 | A4 | 1.7 | | 19.4 | 0.3 |
| S4* | 77.7 | 19.4 | A2 | 1.7 | | 25.8 | 0.9 |
| S5 | 77.7 | 19.4 | A3 | 2 | | 8.3 | 0.7 |
| S6 | 77.7 | 19.4 | A4 | 2.2 | 1.5 | 6.7 | 0.5 |
| S7 | 48.5 | 48.5 | A4 | 9.7 | | 1.3 | 1 |
| S8* | 47.2 | 47.2 | A2 | 3.0 | 1.7 | 4.3 | 2.6 |
| S9 | 47.2 | 47.2 | A3 | 5.9 | 2.9 | 1.6 | 1.2 |
| S10 | 47.2 | 47.2 | A4 | 9.6 | 4 | 2 | 0.9 |
| S11* | 34.0 | 63.1 | A2 | 4.0 | | 2.6 | 2.6 |
| S12 | 34.0 | 63.1 | A3 | 11.5 | | 2.7 | 1.3 |
| S13 | 34.0 | 63.1 | A4 | 26.5 | | 2 | 1 |
| S14* | 18.7 | 74.8 | A2 | 6.3 | 3 | 6.3 | 5 |
| S15* | 18.7 | 74.8 | A3 | 31.5 | 9.4 | 4 | 2.5 |
| S16 | 18.7 | 74.8 | A4 | 109 | 21.4 | 3.5 | 1.8 |
| S17* | 14.6 | 82.5 | A2 | 5.8 | | 5.4 | 5.1 |
| S18 | 14.6 | 82.5 | A3 | 29.1 | | 2.5 | 1.8 |
| S19* | 14.6 | 82.5 | A4 | 173.3 | | 3.3 | 2.2 |
| S20* | 0 | 97.1 | A + A3 | 89.4 | | 10 | 9.5 |
| S21* | 0 | 97.1 | A2 + A4 | 8.0 | | 2.5 | 2.5 |
| S23* | 0.971 | 0 | | 1.4 | | | |

*comparative examples

Example 1

Preparing of Photocurable IAP Compositions

Photocurable compositions were prepared including divinylbenzene and at least one multi-functional acrylate monomer. The compositions varied in the amount of divinylbenzene from about 14.6 wt % to 87.4 wt % and the amount of multi-functional acrylate monomer from 9.7 wt % to 82.5 wt %. Another varying parameter between the photocurable compositions was the type of multi-functional acrylate monomer, which included a bi-functional acrylate monomer (neopentyl glycol diacrylate, herein called A2), a tri-functional acrylate monomer (trimethylolpropane triacrylate, herein called A3), and a tetra-functional acrylate monomer Photocurable Compositions Including 1,3-Diisopropenylbenzene Two further photocurable composition were prepared (S24 and S25), wherein the polymerizable material contained as multi-functional vinylbenzene the monomer 1,3-diisopropenylbenzene (DPB), which was combined with the tri-functional acrylate monomer trimethylolpropane triacrylate (A3). A comparative composition was further made including as polymerizable monomer only 1,3-diisopropenylbenzene (DPB) and no multi-functional acrylate monomer. Both photocurable compositions contained 2 wt % of photoinitiator Irgacure 907 from BASF and 1 wt % surfactant (FS2000M1 from Dianel LAB). A summary of the compositions is shown in Table 2.

TABLE 2

| Sample | Amount of DPB [wt %] | Amount of MFA [wt %] | Type of MFA | Visc 25° C. | % Weight loss TGA 25° C.-350° C. | % Weight loss TGA 350° C.-400° C. |
|---|---|---|---|---|---|---|
| S24 | 19.4 | 77.7 | A3 | 17.32 | 0.07 | 0.5 |
| S25* | 97.1 | — | — | 1.91 | | |

*comparative example

Viscosities

The viscosities of the photocurable compositions were measured using a Brookfield Viscometer LVDV-II+Pro at 200 rpm, with a spindle size #18 and a spin speed of 135 rpm. For the viscosity testing, about 6-7 mL of sample liquid was added into the sample chamber, enough to cover the spindle head. The sample contained in the chamber was about 20 minutes equilibrated to reach the desired measuring temperature, which was 23° C. or 50° C., before the actual measurement was started. For all viscosity testing, at least three measurements were conducted and an average value was calculated.

Most of the photocurable compositions had a viscosity at 23° C. of below 10 mPa·s. Only samples with a low amount of DVB and a high amount of tri-functional or tetra-functional acrylate monomer (samples 15 and 16) had viscosities higher than 10 mPa·s, such as 31 mPa·s and 106 mPa·s at 23° C. In order to make these compositions suitable for inkjet printing, an increase in temperature to 50° C. could lower the viscosities to a range below 30 mPa·s, which is acceptable for IAP processes.

Thermal Stability of Photo-Cured Layers

Photo-cured films were made by applying a 300 microns thick layer of the tested photocurable composition on a glass substrate and curing the film at room temperature (23° C.) with UV light having maximum wave length of 365 nm and a light intensity of 14 mW/cm$^2$ for 11.5 minutes, which corresponds to a curing energy dosage of about 10.0 J/cm$^2$ to form a solid layer. For photocurable compositions which contained more than 50 wt % divinylvenzene, the curing time was doubled to 23 minutes to conduct the photo-curing.

The photo-cured films were subjected to the following heat treatment regime: 25 mg of the photo-cured film was placed in an alumina crucible and subjected to TGA measurement using a Linseis STA PT 1000 instrument. The heating of the sample was conducted from 25° C. to 450° C. at a heating rate of 20° C./minute under nitrogen, and the cumulative percent weight loss from 25° C. to 350° C. and from 350° C. to 400° C. was read from the TGA curve. The test sample was heated up to pass its initial degradation temperature, which was for most of the tested samples in the range between 420 to 440° C.

It can be seen from the data in Tables 1 and 2 that certain combinations of divinylbenzene (DVB) or 1,3-diisopropenylbenzene (DPB) with a tri-acrylate monomer or a tetra-acrylate monomer can form photo-cured layers having excellent thermal stabilities, wherein the weight loss during the heating from 25 to 350° C. (herein also called "first weight loss") was not greater than 10%, and during further heating from 350° C. to 400° C. (herein also called "second weight loss") was not greater than 2%. A particularly high heat stability showed the photo-cured layer of sample S24, the combination of 1,3-diisopropenylbenzene (DPB) with trimethylolpropane triacrylate (A3), wherein the first weight loss between 25° C. to 350° C. was 0.07% and the second weight loss during heating from 350° C. to 400° C. was 0.5%.

Figure 1B:
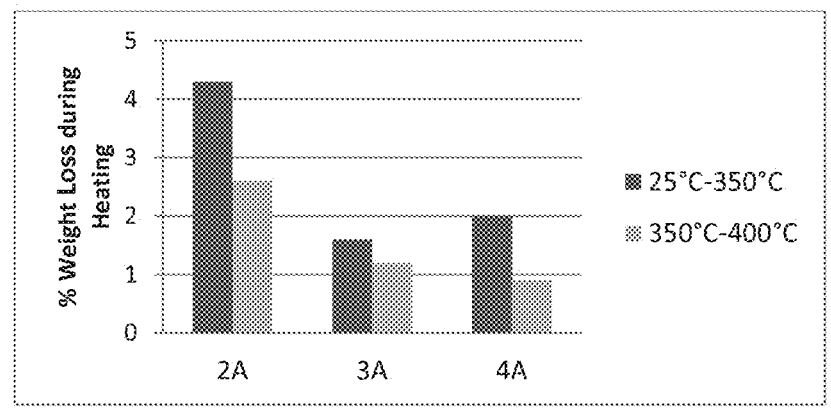
FIG. 1B includes a graph illustrating the first- and second weight loss during heating of photo-cured layers made from photocurable compositions containing about 47 wt % divinylbenzene and about 47 wt % multi-functional acrylate monomer with varying types of multi-functional acrylate monomers according to embodiments.
Figure 1C:
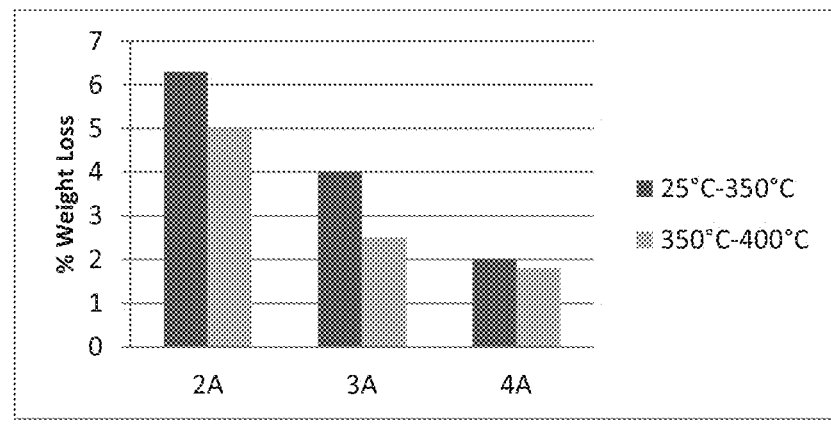
FIG. 1C includes a graph illustrating the first- and second weight loss during heating of photo-cured layers made from photocurable compositions containing about 19 wt % divinylbenzene and about 75 wt % multi-functional acrylate monomer with varying types of multi-functional acrylate monomers according to embodiments.

FIGS. 1A, 1B, and 1C illustrate three different concentration ratios of DVB to MFA (all taken from Table 1), wherein the type of MFA was varied between bi-functional (A2), tri-functional (A3), and tetra-functional acrylate monomer (A4). It can be seen that the lowest weight loss within all concentration ratios occurred when using the tetra-functional acrylate monomer, and similar results could be obtained with the tri-functional acrylate monomer. In contrast, the bi-functional acrylate monomer had a very high weight loss during heating from 25° C.–350° C. of up to 25.8 percent if used in low amounts (0.194 wt %), and a comparative high weight loss of greater than 2% during the heating from 350° C.–400° C. The best heat stability was obtained if the amount of DVB and the tri-functional or the tetra-functional acrylate monomer was at an even level (see FIG. 1B).

Figure 2:
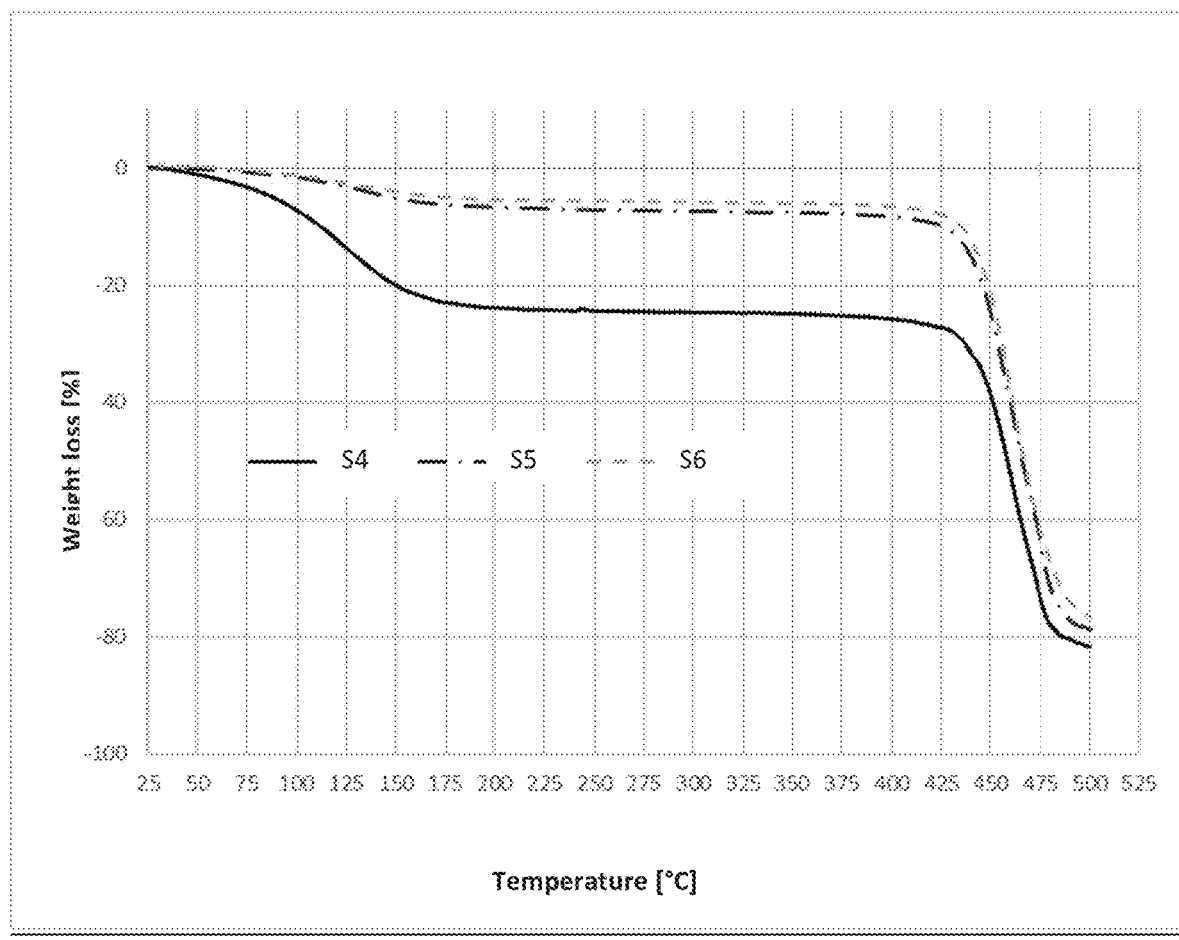
FIG. 2 includes a graph illustrating the weight loss of photo-cured layers via thermographic analysis (TGA) at a rate of 20° C./minute according to embodiments.

An illustration of TGA curves of samples 5 and 6 and comparative sample 4 is shown in FIG. 2. It can be seen that for all three curves the largest drop in weight occurred during heating from about 25° C. to about 175° C. Not being bound to theory, the reason for the weight loss between 25° C. to 175° C. appears to be evaporation and/or degradation of unreacted monomers which were still contained within the photo-cured layers.

A further type of heat treatment was conducted by placing the photo-cured layer on a hotplate having a temperature of 250° C. for 30 minutes, and thereafter allowing the samples to cool down to room temperature and re-heating the sample at a rate of 20° C./minute from 25° C. to 400° C. and above, until degradation is significantly observed (weight loss >30%).

Figure 3:
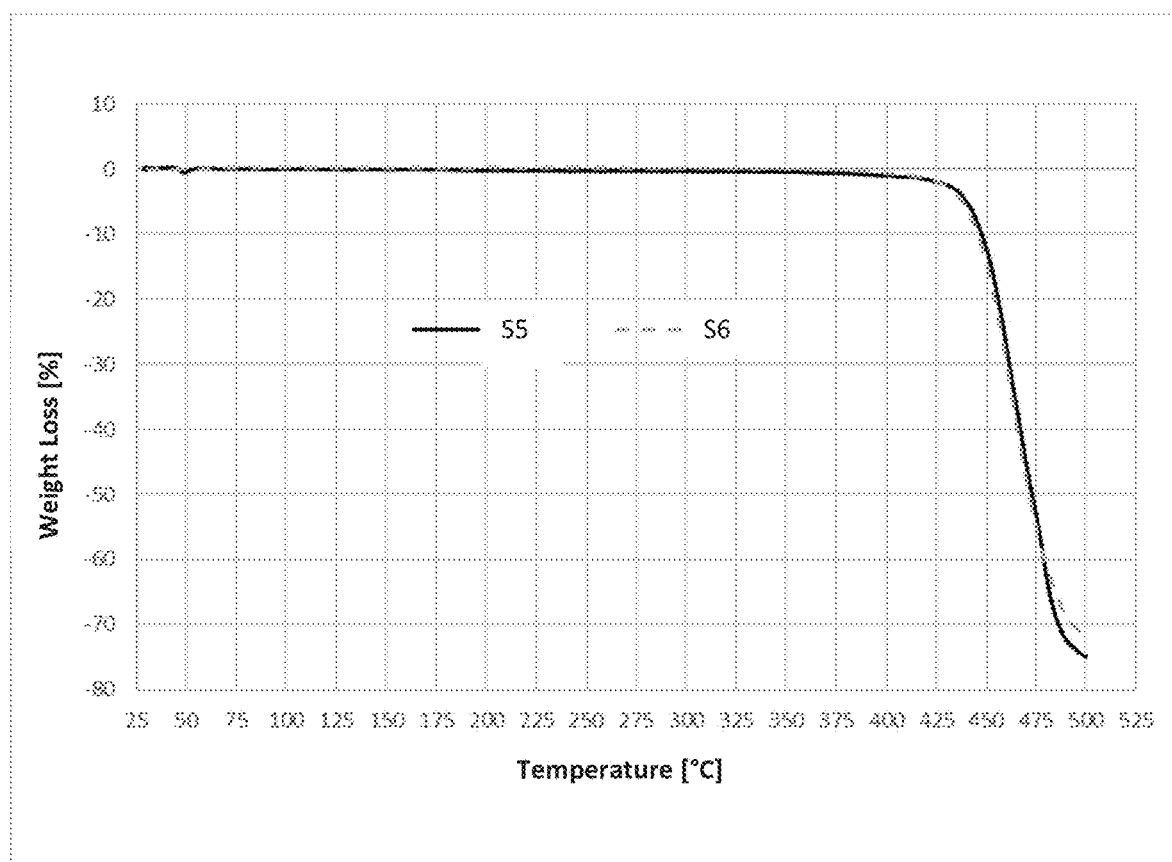
FIG. 3 includes a graph illustrating the weight loss of photo-cured layers via thermographic analysis (TGA) at a rate of 20° C./minute, wherein the TGA was conducted after a baking treatment of the photo-cured layers at 250° C. for 30 minutes according to embodiments.

The baking treatment, combined with the TGA measurement, was conducted with photo-cured layers formed from samples 5 and 6. It was observed that after the baking treatment, the baked layers (herein called samples 5B and 6B) had an excellent heat stability up to a temperature of 400° C. The weight loss for samples 5 and 6 measured during re-heating via TGA in the range of 25° C. to 350° C. (first weight loss) and from 350° C. to 400° C. (second weight loss) is shown in Table 3, and the complete TGA curves are illustrated in FIG. 3.

TABLE 3

| Sample | % Weight Loss | |
|---|---|---|
| | 25° C.-350° C. | 350° C.-400° C. |
| 5-B | 0.6 | 1.0 |
| 6-B | 0 | 0.6 |

Glass Transition Temperature

The glass transition temperatures of the photo-cured layers were measured with an Anton-Paar MCR-301 rheometer coupled with a Hamamatsu Lightningcure LC8 UV source. The sample was radiated with a UV intensity of 100 mW/cm$^2$ at 365 nm controlled by a Hamamatsu 365 nm UV power meter. Software named RheoPlus was used to control the rheometer and to conduct the data analysis. The temperature was controlled by a Julabo F25-ME water unit and set to 23° C. as starting temperature. For each sample testing, 7 µl resist sample was added onto a glass plate positioned directly underneath the measuring system of the rheometer. Before starting with the UV radiation, the distance between glass plate and measuring unit was reduced to a gap of 0.1 mm. The UV radiation exposure was continued until the storage modulus reached a plateau, and the height of the plateau was recorded as the storage modulus. After the UV curing was completed, the temperature of the cured sample was increased by controlled heating to measure the change of the storage modulus in dependency to the temperature to obtain the glass transition temperature Tg. As glass transition temperature Tg was considered the temperature corresponding to the maximal value of Tangent (0).

Table 3 includes measured glass transition temperature ($T_g$) of photo-cured layers made from photo-curable compositions representative of the present disclosure. It can be seen that the $T_g$ ranges from 137° C. up to values above 180°

C. Such high Tg values are desirable, since it is known that a high Tg can reduce the line waviness during etching and enhance the etch performance of a resist.

In contrast to the glass transition temperatures ($T_g$) of representative samples of the present disclosure, Table 4 further includes the $T_g$ of the homopolymers formed by the monomers used in the present examples, such as homopolymers of divinylbenzene (DVB), neopentyl glycol diacrylate (A2), trimethylolpropane triacrylate (A3), and tetramethylolmethane tetraacrylate (A4). The $T_g$ of the homopolymers was obtained from published literature data. It can be seen that certain combinations of the monomers contained in the photocurable composition may lead to polymeric materials after curing with a highly increased glass transition temperature compared to the $T_g$ of the homopolymers.

TABLE 4

| Sample | Glass Transition Temperature [° C.] | Type of MFA | Photocurable composition DVB:MFA |
| --- | --- | --- | --- |
| DVB | 94.5 | | |
| A2 (bi-acrylate) | 107 | | |
| A3 (tri-acrylate) | 62 | | |
| A4 (tetra-acrylate) | 103 | | |
| S5 | 137 | A3 | 4.1:1 |
| S6 | 182 | A4 | 4.1:1 |
| S9 | 132 | A3 | 1:1 |
| S10 | 183 | A4 | 1:1 |
| S16 | 184 | A4 | 1:4 |

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A photocurable composition comprising a polymerizable material and a photo-initiator, wherein
the polymerizable material comprises at least one multi-functional vinylbenzene in an amount of 15 wt % to 85 wt % based on the total weight of the photocurable composition and at least one multi-functional acrylate monomer in an amount of 15 wt % to 85 wt % based on the total weight of the photocurable composition; and
a photo-cured layer of the photocurable composition comprises a first weight loss of not greater than 10% loss during heating from 25° C. to 350° C. at a rate of 20° C./min, and a second weight loss of not greater than 2.0% during further heating from 350° C. to 400° C. at a rate of 20° C./min under nitrogen.

2. The photocurable composition of claim 1, wherein the first weight loss is not greater than 5%.

3. The photocurable composition of claim 1, wherein the second weight loss is not greater than 1.5%.

4. The photocurable composition of claim 1, wherein a glass transition temperature of the photo-cured layer after curing of the photocurable composition is at least 135° C.

5. The photocurable composition of claim 3, wherein the glass transition temperature of the photo-cured layer is at least 160° C.

6. The photocurable composition of claim 1, wherein the multi-functional acrylate monomer is a tri-functional acrylate monomer, a tetra-functional acrylate monomer, or a combination thereof and the multi-functional vinylbenzene is divinylbenzene (DVB) or 1,3-diisopropenylbenzene (DPB), or a combination of DVB and DPB.

7. The photocurable composition of claim 6, wherein an amount of the DVB and/or DPB is between 20 wt % to 50 wt % based on the total weight of the photocurable composition, and an amount of the multi-functional acrylate monomer is between 45 wt % to 65 wt % based on the total weight of the photocurable composition.

8. The photocurable composition of claim 6, wherein an amount of the multi-functional acrylate monomer is at least 60 wt % and not greater than 85 wt % and an amount of the DVB and/or DPB is at least 15 wt % and not greater than 35 wt % based on the total weight of the photocurable composition.

9. The photocurable composition of claim 6, wherein an amount of the DVB and/or DPB is at least 70 wt % and not greater than 85 wt % based on the total weight of the photocurable composition.

10. The photocurable composition of claim 6, wherein a weight % ratio of DVB and/or DPB to the multi-functional acrylate monomer ranges from 1:7 to 7:1.

11. The photocurable composition of claim 1, wherein a viscosity of the photocurable composition is not greater than 30 mPa·s at a temperature of 50° C.

12. The photocurable composition of claim 1, wherein an amount of the polymerizable material is at least 90 wt % based on the total weight of the photo-curable composition.

13. A laminate comprising a substrate and a photo-cured layer overlying the substrate, wherein the photo-cured layer is formed from the photocurable composition of claim 1.

14. The laminate of claim 13, wherein the second weight loss of the photo-cured layer is not greater than 1.5%.

15. The laminate of claim 13, wherein the photo-cured layer comprises a glass transition temperature of at least 135° C.

16. A method of forming a photo-cured layer on a substrate, comprising:
applying a layer of a photocurable composition on the substrate, wherein the photocurable composition comprises a polymerizable material and a photoinitiator, wherein the polymerizable material comprises at least one multi-functional vinylbenzene in an amount of 15 wt % to 85 wt % of and at least one multi-functional acrylate monomer in an amount of 15 wt % to 85 wt % based on the total weight of the photocurable composition;
bringing the photocurable composition into contact with a superstrate;
irradiating the photocurable composition with light to form a photo-cured layer; and
removing the superstrate from the photo-cured layer, wherein the photo-cured layer comprises a first weight loss of not greater than 10% during heating from 25° C.

to 350° C. at a rate of 20° C./min, and a second weight loss of not greater than 2.0% during further heating from 350° C. to 400° C. at a rate of 20° C./min under nitrogen.

17. The method of claim 16, wherein the multi-functional acrylate monomer is a tri-functional acrylate monomer or a tetra-functional acrylate monomer.

18. The method of claim 16, wherein a viscosity of the photocurable composition is not greater than 30 mPa·s at a temperature of 50° C.

19. The method of claim 16, wherein a glass transition temperature of the photo-cured layer is at least 135° C.

20. A method of manufacturing an article, comprising:
applying a layer of a photocurable composition on a substrate, wherein the photocurable composition comprises a polymerizable material and a photoinitiator, the polymerizable material comprises at least one multi-functional vinylbenzene in an amount of 15 wt % to 85 wt % and at least one multi-functional acrylate monomer in an amount of 15 wt % to 85 wt % based on the total weight of the photocurable composition;
bringing the photocurable composition into contact with a superstrate;
irradiating the photocurable composition with light to form a photo-cured layer;
removing the superstrate from the photo-cured layer;
forming a pattern on the substrate;
processing the substrate on which the pattern has been formed in the forming; and
manufacturing an article from the substrate processed in the processing, wherein the photo-cured layer comprises a first weight loss of not greater than 10% during heating from 25° C. to 350° C. at a rate of 20° C./min, and a second weight loss of not greater than 2.0% during further heating from 350° C. to 400° C. at a rate of 20° C./min under nitrogen.

* * * * *